United States Patent [19]

Deligny

[11] Patent Number: 4,756,397
[45] Date of Patent: Jul. 12, 1988

[54] MECHANICAL CABLE CONTROL WITH AN AUTOMATIC ADJUSTMENT DEVICE AND AN ELECTRICAL DETECTOR OF OPERATION

[75] Inventor: Jean Deligny, Le Mans, France

[73] Assignee: Societe des Cables du Mans, Le Mans, France

[21] Appl. No.: 827,126

[22] Filed: Feb. 6, 1986

[30] Foreign Application Priority Data

Feb. 20, 1985 [FR] France ................................. 85 02461

[51] Int. Cl.⁴ ............................................... F16P 13/75
[52] U.S. Cl. ................................ 192/111 A; 192/30 W
[58] Field of Search ............ 192/111 A, 111 B, 70.25, 192/30 W; 188/2 D, 196 R, 265; 340/52 R, 52 A

[56] References Cited

U.S. PATENT DOCUMENTS

| | | | |
|---|---|---|---|
| 2,072,010 | 2/1937 | Moorhouse | 192/111 A |
| 3,921,773 | 11/1975 | Dietrich | 192/111 A X |
| 3,946,845 | 3/1976 | Kamio | 192/111 A |
| 4,448,090 | 5/1984 | Carré et al. | 192/111 A X |
| 4,456,101 | 6/1984 | Yamamoto et al. | 192/111 A X |
| 4,464,951 | 8/1984 | Courbot | 192/111 A X |
| 4,499,450 | 2/1985 | Makita | 340/52 R |
| 4,550,815 | 11/1985 | Gale | 340/52 R |
| 4,556,137 | 12/1985 | Abe | 192/30 W X |
| 4,598,809 | 7/1986 | Glover et al. | 192/111 A |

Primary Examiner—David A. Scherbel
Assistant Examiner—Creighton Smith
Attorney, Agent, or Firm—Solon B. Kemon

[57] ABSTRACT

The mechanical cable control, including an automatic adjustment device (4, 5, 9/7) between a first portion (2) of the shielding conduit of the cable and an outer ferrule structure (6) comprises at least one electrical path mechanism (I; II) incorporating a pair of cooperating electrical contacts (12, 11; 12', 11'), attached to the outer ferrule structure (6) and, via a disengageable connection, to an extension of the first conduit portion (2). The cable control typically incorporates a pair of contacts (11, 12) for detecting the operation of the control and a pair of contacts (11'; 12') for indicating the wear of the component to be actuated (C) by the cable control.

9 Claims, 3 Drawing Sheets

MECHANICAL CABLE CONTROL WITH AN AUTOMATIC ADJUSTMENT DEVICE AND AN ELECTRICAL DETECTOR OF OPERATION

The present invention concerns mechanical controls by a cable sliding in a shielding conduit, including an automatic adjustment device for the recovery of operational play, more particularly for the control of the friction clutch of a motor vehicle, of the type comprising a disengageable locking device which is capable of firmly interconnecting together selectively, during operation of the mechanical control, an outer ferrule structure and an inner ferrule structure which is firmly fixed to one end of the shielding conduit and is housed telescopically in the outer ferrule structure, the two ferrule structures being biased apart axially relative to one another.

A mechnical control of this type is described particularly in the U.S. Pat. Nos. 4,420,988 and 4,464,950 whose contents are assumed to be incorporated herewith for reference.

One object of the present invention is to propose a mechanical control of the type mentioned above exploiting the kinematics of the automatic adjustment device so as to provide an electrical indication of the actuation of the component actuated (typically a clutch) by this mechanical control by means of an arrangement which is particularly simple and robust, not requiring any modifications to the general arrangement of the mechanical control and of its automatic adjustment device, and retaining the characteristics of robustness and reliability of the mechanical control.

To achieve this, according to a feature of the invention, at least one electrical path means is provided incorporating a pair of electrical contacts which cooperate selectively and comprise, respectively a first electrical contact attached to the outer ferrule structure and a second electrical contact attached to the inner ferrule structure in such a way as to be capable of moving with it.

More specifically, according to a particular feature of the invention, the second contact is associated with the inner ferrule structure by a connection which is capable of being disengaged, and advantageously by frictional engagement.

With such an arrangement, it is thus possible, each time the mechanical control is put into operation, to obtain immediately by the opening or closure of the electrical path means incorporating the pair of co-operating electrical contacts, an electrical signal indicating the actuation of the component to be actuated without requiring the provision of special electrical contacts in the region of the component to be actuated or in the region of the actuating component of the mechanical control (typically a pedal) with the well known disadvantages regarding the environment of these actuating components or components to be actuated.

Owing to the perfect operation of the automatic adjustment devices of the mechanical controls by cable of the type mentioned above, the travel of the actuating component or pedal remains constant irrespective of the progressive wear of the friction linings of the clutch so that the detection of an advanced state of wear of this clutch requires visual inspection.

This is the reason why another object of the present invention is to propose a mechanical control such as defined above incorporating two electrical path means which are similar but distinct so as to obtain, besides information concerning the actuation of the component to be actuated, information deduced from the kinematics of the automatic adjustment device about the state of wear of the component to be actuated.

Thus, according to another feature of the invention for the second contacts of each electrical path means, different axial ranges of movement are provided, that is to say for one of the electrical path means, a reduced range which is less than the locking travel of the locking device, and for the other electrical path means, a greater predetermined travel which corresponds to the wear travel fixed for the component to be actuated.

Other features and advantages of the present invention will emerge from the following description of embodiments, given by way of illustration but not limiting in any way, with reference to the accompanying drawings, in which.

In the following description and in the drawings, identical or similar components carry the same reference numbers, possibly primed.

Figure 1:
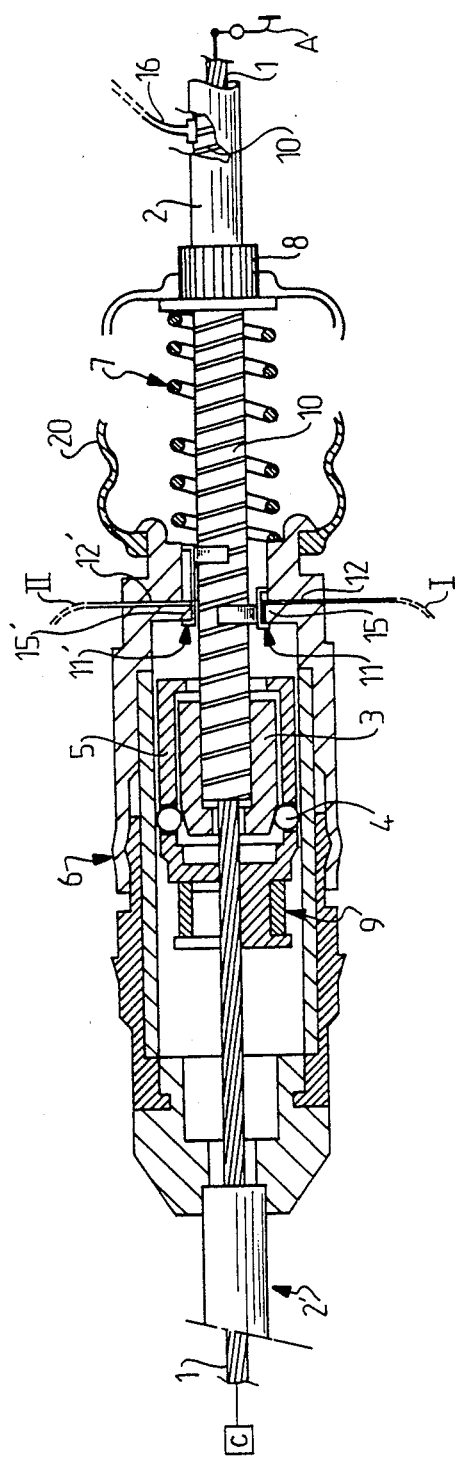
FIG. 1 is a diagrammatic view in longitudinal section of a first embodiment of a mechanical control by cable according to the invention.
Figure 2:
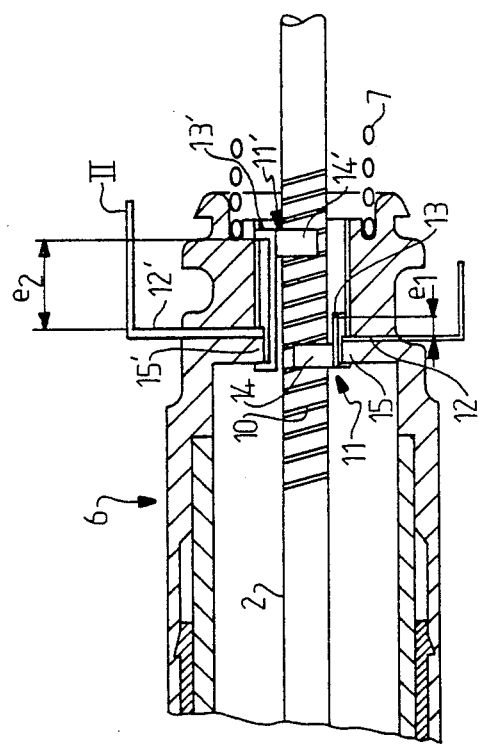
FIG. 2 is a partial view at a larger scale of the mechanical control shown in FIG. 1 showing the arrangement of the electrical contacts.

The mechanical control by cable shown in FIGS. 1 and 2 is of the type incorporating an automatic adjustment device arranged between two ferrule structures which are firmly fixed to two axially separated portions of the shielding conduit of the cable, thus not requiring any mounting on a fixed support, in accordance with the instructions in U.S. Pat. No. 4,464,950 mentioned above. It will be recalled briefly that in this embodiment the mechanical control incorporates a length of cable 1 mounted so as to slide axially in a flexible shielding conduit consisting of two successive separated portions 2 and 2'. The end of the first conduit portion 2 is housed in a solid terminal block 3 through which the cable 1 passes, which block has a peripheral surface in the shape of a truncated cone forming an actuating cam for the locking components, in this case clamping balls 4 carried by a cylindrical cage 5, which is itself housed in the internal cylindrical housing of an outer ferrule structure forming a casing 6 with whose inside cylindrical surface the clamping balls 4 cooperate, the outer ferrule structure 6 being firmly fixed to the adjacent end of the other conduit portion 2. A separating spring 7 is situated between the second outer ferrule structure 6 and a collar 8 which is crimped onto the first conduit portion 2. The control of the locking device which is capable of being disengaged, namely the relative movement between the inner ferrule structure 2,3 and the outer ferrule structure 6 is constructed in the embodiment shown by a friction component 9 which is joined to the cage 5 and which cooperates, in frictional engagement which is capable of being disengaged, with the central stranded portion of the cable 1. In this type of mechanical control, in the rest configuration (shown in FIG. 1), the two ferrule structures 2,3 and 6 are disconnected and the separating spring 7 can recover the operational play which is capable of appearing in the mechanical control or in the component to be actuated C. During each actuation of the mechanical control by the actuating component A, the cable 1 drives, during the first stage, the friction component 9 so as to bring the clamping balls 4 to lock the two ferrule structures 2,3 and 6 together, after which the cable continues to be actuated by sliding relative to the friction component 9. In accorance with the invention, this locking travel of the balls 4 is utilized to provide an indication of the actuation of the mechanical control. As the cable shielding conduits are provided, as a general rule, with a helical metal armour, this metal armour 10 is stripped from a conduit portion 2 between the block 3 and the collar 8 and a first mobile electrical contact structure 11 is mounted on this stripped portion of the conduit 2, the first mobile electrical contact structure 11 being intended to cooperate with a second electrical contact 12 which is firmly fixed to the outer ferrule structure 6.

As shown more clearly in FIG. 2, the movable contact structure 11 incorporates a U-shaped portion 13 which is firmly fixed to a C-shaped elastic metal clip 14 which is engaged by means of a separating force onto the stripped portion of the conduit portion 2. The U-shaped structure 13 is arranged in such a way that it is held captive between the two opposite arms of the U, a shoulder projecting towards the inside 15 of the outer ferrule structure 6, the fixed contact 12 consisting of a metal strip passing radially through the outer ferrule structure 6 which is made at least locally of plastic, in such a way that in fact its inner radial end forms one of the axially opposed abutment surfaces of the shoulder 15. The U-shaped portion 13 of the movable contact structure is dimensioned in such a way that, in the rest configuration shown in FIGS. 1 and 2, one of the arms of the U is in abutment against the abutment face of the shoulder 15 remote from the strip 12, and that there exists between this strip 12 and the other arm of the U-shaped component 13 a clearance $e_1$ which is less than the locking travel mentioned above of the ball cage 5 of the order of 1 to 1.5 mm, for example. In this way, each time the mechanical control by cable is put into operation, a relative movement occurs of the conduit portion 2 relative to the outer ferrule structure 6 eliminating the clearance $e_1$ so as to close (in the embodiment shown) the first electrical path means I incorporating the fixed contact 12, the movable contact 11, the armour 10 and an electrical conductor 16 connected to a stripped portion of the armour 10 of the first conduit portion 2 at a point beyond the collar 8, and thereby effect an electrical output signal. The frictional engagement between the movable electrical contact 11 and the first conduit portion 2 allows, by means of the elastic clip 14, the movable contact 11 to position itself automatically at each operation and to move relative to the first conduit portion 2 during each phase of the automatic recovery of play between the two conduit portions 2 and 2'.

According to another feature of the invention, as shown clearly in FIGS. 1 and 2, the mechanical control also incorporates a second movable contact structure 11' which is identical to the first movable contact structure 11 and which cooperates in a similar manner with a shoulder 15' of the outer ferrule structure 6 which is bounded laterally by a second fixed contact 12' forming part of a second electrical path means II, but differing in that the clearance at rest $e_2$ between the fixed contact strip 12' and the adjacent arm of the U-shaped component 13' of the second movable contact 11' is determined in this case so as to correspond to the wear travel chosen by the manufacturer for the component to be actuated C. Thus the contacts 11' and 12' only close and effect an electrical output signal (in the embodiment shown) when the conduit portions 2 and 2' move telescopically through a distance $e_2$ relative to one another so as to recover the clearance of the mechanical control which corresponds precisely to the amount of wear determined for the component to be actuated, of the order of 8 to 10 mm, for example. The second contacts 11' and 12' thus only normally intervene once during the useful life of the component to be actuated C whereas the first contacts 11 and 12 are put into operation at each actuation of the mechanical control.

Figure 3:
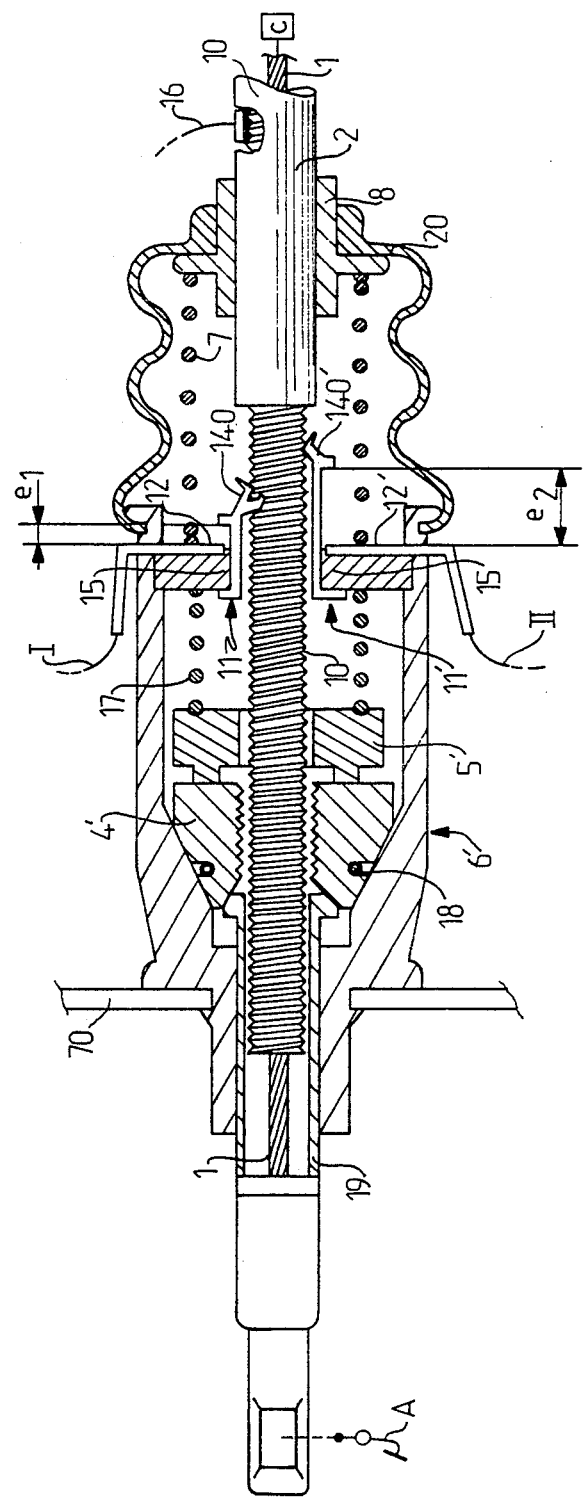
FIG. 3 is a view in longitudinal section of a second embodiment of the mechanical control by cable according to the invention.

The mechanical control shown in FIG. 3 differs from that previously described in that the automatic adjustment device is situated in this case in an outer ferrule structure 6' which is fixed and is mounted on a stationary bulkhead 70 in the region of the actuating component A. In this case, the locking device incorporates jaws 4' supported on a cage 5', co-operating with a conical surface formed in this case by the outer ferrule structure 6, the jaws normally being pushed into engagement with the stripped armour of the end of the conduit portion 2 by springs 17 and 18, the jaws being held separated from the conduit 2, however, in the rest configuration of the mechanical control, by a plunger 19 actuated by the actuating component A so as to allow, in this same rest configuration, a separating spring 7 to recover the play which will possibly appear in the mechanical control or in the component to be actuated C. In this embodiment, the same pairs of contacts 11,12 and 11',12' are incorporated as in the embodiment described previously. However, in the embodiment shown in FIG. 3, the armour 10 of the conduit portion 2 advantageously being specially formed so as to have external indentation, it is possible to provide, as a means of connection which is capable of being disengaged between the contacts 11 and 11' and the armour 10, simple elastic profiled fingers 140 and 140' engaging between the indentations of the armour 10 instead of the clips previously described.

In either embodiment it is possible to arrange, as shown in FIG. 2, that the arm forming a contact of the contacts 11 and 11' slides in longitudinal grooves in the internal bore of the outer ferrule structure 6 or 6' so as to avoid undesirable rotation of these movable contacts relative to the outer ferrule structure. It will also be noted that if mechanical controls such as those described are advantageously provided with a protective bellows 20 situated between the collar 8 and the outer ferrule structure 6 or 6', around the separating spring 7, the pairs of contacts 11,12 and 11',12' are perfectly protected against the introduction of contaminating agents, thus ensuring perfect mechanical and electrical reliability of the electrical means of detection.

Although the present invention is described above in relation to particular embodiments, it is not limited by them but on the contrary is capable of modifications and variants which will be apparent to a person versed in the art. In particular, in the preceding description, the pairs of contacts 11,12 and 11',12' are arranged so as to be normally open, and to close to provide an electrical indicating signal. As a variant, it is possible to provide, for the first pair of contacts 11 and 12, a reversed arrangement, normally closed and opening when the device is put into operation. In the same way, instead of using the stripped armour of the conduit portion 2 as a conducting support for the movable contacts 11 and 11', it is possible to use, coming from the collar 8, a separate hollow metal rod providing exactly the same functions.

I claim:

1. A mechanical control device comprising:
   a shielding conduit;
   a cable slidable within said shielding conduit;
   an inner ferrule structure formed on one end of said shielding conduit;
   an outer ferrule structure positioned coaxially of said inner ferrule structure;
   biassing means positioned to urge said inner ferrule structure axially of said outer ferrule structure;
   a releasable locking device positioned to effect in a locked position rigid interconnection between said inner and outer ferrule structures, and in a released position to permit axial movement of said inner ferrule structure relative to said outer ferrule structure between an advanced position in which the releasable locking device is in a locked position and a retracted position in which the releasable locking device is in a released position;
   a first electrical contact means including a movable contact structure in electrical contact with and resiliently and slidably mounted on said inner ferrule structure and the associated shielding conduit;
   a shoulder of non-electrical conducting material formed on said outer ferrule structure and having opposed first and second faces engageable by opposed co-operating faces on said movable contact structure respectively alternatively with movement of said inner ferrule structure relative to said outer ferrule structure;
   second electrical contact means positioned in the first face of said shoulder and arranged to be contacted by said movable contact structure upon movement of said inner ferrule structure axially of said outer ferrule structure to the advanced position to close an electrical circuit path through said first and second circuit means, the electrical circuit path being opened by movement of said inner ferrule structure away from the advanced position toward the retracted position.

2. A mechanical control device as claimed in claim 1, wherein upon movement of the inner ferrule structure relative to the outer ferrule structure from the advanced position towards the retracted position the movable contact structure engages the second face on the shoulder formed on the outer ferrule structure, such that the inner ferrule structure moves relative to the metallic saddle by resiliently deforming the resilient connection.

3. A mechanical control device as claimed in claim 1 wherein a third electrical contact means including a further movable contact structure in electrical contact with the inner ferrule structure is resiliently and slidably mounted thereon;
   a shoulder of non-electrical conducting material formed on said outer ferrule structure and having opposed first and second faces engageable by opposed cooperating faces on said further movable contact structure respectively alternatively with movement of said inner ferrule structure relative to said outer ferrule structure;
   fourth electrical contact means positioned in the first face of said further shoulder arranged to be contacted by said further movable contact structure upon movement of said inner ferrule structure axially of said outer ferrule structure to the advanced position to close a further electrical circuit path through the third and fourth circuit means, the further electrical circuit path being opened by movement of said inner ferrule structure away from the advanced position toward the retracted position.

4. A mechanical control device as claimed in claim 2 wherein a third electrical contact means including a further movable contact structure in electrical contact with the inner ferrule structure is resiliently and slidably mounted thereon;
   a shoulder of non-electrical conducting material formed on said outer ferrule structure and having opposed first and second faces engageable by opposed cooperating faces on said further movable contact structure respectively alternatively with movement of said inner ferrule structure relative to said outer ferrule structure;
   fourth electrical contact means positioned in the first face of said further shoulder arranged to be contacted by said further metallic saddle upon movement of said inner ferrule structure axially of said outer ferrule structure to the advanced position to close a further electrical circuit path through the third and fourth circuit means, the further electrical circuit path being opened by movement of said inner ferrule structure away from the advanced position toward the retracted position.

5. A mechanical control device as claimed in claim 3, wherein upon movement of the inner ferrule structure relative to the outer ferrule structure from the advanced position towards the retracted position the further metallic saddle engages the second face on the further shoulder formed on the outer ferrule structure, such that the inner ferrule structure moves relative to the further metallic saddle by resiliently deforming the resilient connection.

6. A mechanical control device as claimed in claim 4, wherein upon movement of the inner ferrule structure relative to the outer ferrule structure from the advanced position towards the retracted position the further movable contact structure engages the second face on the further shoulder formed on the outer ferrule structure, such that the inner ferrule structure moves relative to the further movable contact structure by resiliently deforming the resilient connection.

7. The mechanical control according to claim 1, characterized in that an axial range of movement predetermined for a second electrical contact of the second electrical circuit means is different from the axial range of movement for the one electrical circuit means.

8. The mechanical control according to claim 1, characterized in that the outer ferrule structure is mounted on a fixed support.

9. The mechanical control according to claim 1, characterized in that the inner ferrule structure is fixed firmly to one end of a first conduit portion, and the outer ferrule structure fixed firmly to a second conduit portion.

* * * * *